B. FORD AND E. W. SMITH.
METHOD OF MAKING STORAGE BATTERY SEPARATORS.
APPLICATION FILED FEB. 28, 1918.
1,364,493.
Patented Jan. 4, 1921.
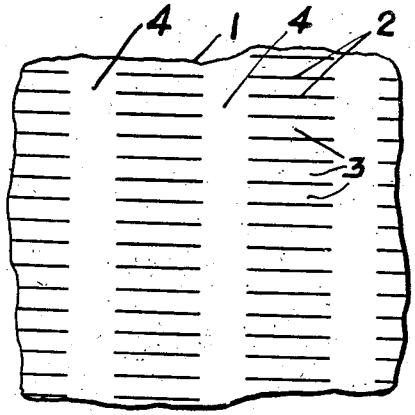
FIG.1.
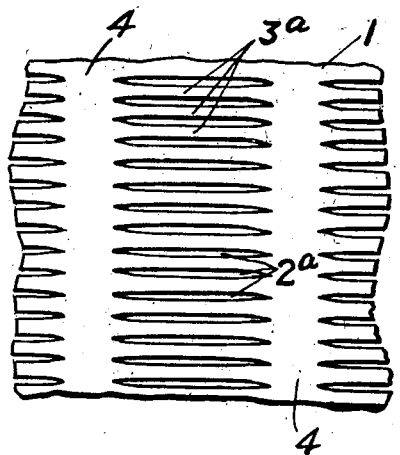
FIG.3.
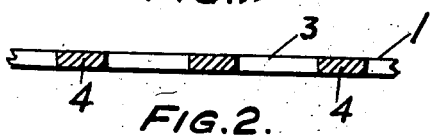
FIG.2.
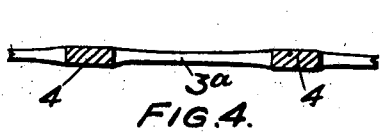
FIG.4.
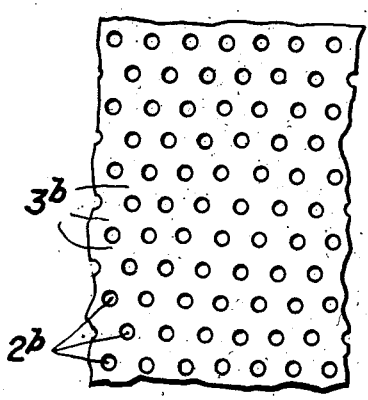
FIG.5.
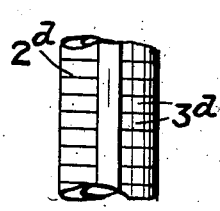
FIG.9.
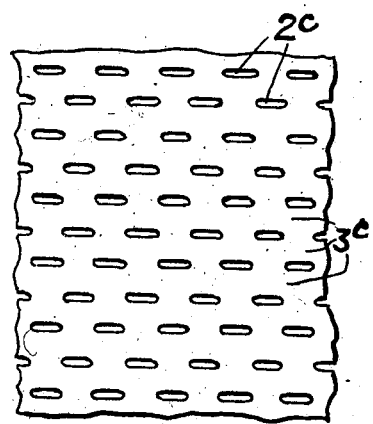
FIG.7.
FIG.6.
FIG.8.
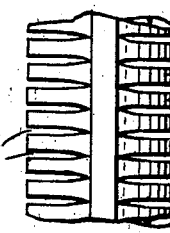
FIG.10.
WITNESS:
INVENTORS
Bruce Ford and
Edward Wanton Smith
BY
Augustus B. Stoughton
ATTORNEY.

UNITED STATES PATENT OFFICE.

BRUCE FORD AND EDWARD WANTON SMITH, OF PHILADELPHIA, PENNSYLVANIA.

METHOD OF MAKING STORAGE-BATTERY SEPARATORS.

1,364,493.      Specification of Letters Patent.      Patented Jan. 4, 1921.

Application filed February 28, 1918. Serial No. 219,577.

*To all whom it may concern:*

Be it known that we, BRUCE FORD and EDWARD WANTON SMITH, citizens of the United States, and residents of Philadelphia, in the county of Philadelphia and State of Pennsylvania, have invented certain new and useful Improvements in Methods of Making Storage-Battery Separators, of which the following is a specification.

The principal object of the present invention is to provide an expeditious, reliable and comparatively simple method of making separators or retainers for the plates of secondary or storage batteries.

According to our invention a sheet or wall is slitted or gashed, or has pieces punched out of it to make openings, and the bars between these slits or openings are contracted by elongation to permanently separate the edges of the slits or enlarge the openings.

The invention will be claimed at the end hereof, but will be first described in connection with the accompanying drawings, forming part hereof, and in which—

Figures 1 and 2, are a top and a sectional view of a slitted sheet or wall showing bars between and parallel with the slits.

Figs. 3 and 4, are similar views showing the wall after the bars have been contracted by elongation, thus opening the slits.

Figs. 5 and 6 are a top and sectional view of a wall or sheet having openings formed by the removal of some of the material of which it is composed.

Figs. 7 and 8 are like views of the sheet shown in Figs. 5 and 6, after the openings have been enlarged by contracting the bars or material between them by elongation, and Figs. 9 and 10, are side views of a tubular separator or retainer and of them, Fig. 9 shows the separator ready for treatment by the process of the invention, and Fig. 10 shows the separator complete with its slits or openings enlarged.

Referring more particularly to Figs. 1 to 4, 1 is a wall or sheet of material adapted for use in making separators or retainers and capable of being stretched or elongated as by rolling or pulling, and also capable of remaining in stretched, elongated or enlarged condition. This material may be celluloid, hard rubber or lead, and its thickness is that appropriate for separators and retainers. In the case of lead the article is perhaps more of a retainer than a separator. 2, are a series of parallel slits shown as arranged in rows, with bars 3 between them. 4, may be referred to as blanks between the ends of the slits of the respective rows. The bars are contracted by elongation into the form diagrammatically represented at $3^a$ in Figs. 3 and 4, with the result that the slits or openings are enlarged, as shown at $2^a$, Figs. 3 and 4. This result can be accomplished by passing the sheet of Figs. 1 and 2 through stretching rolls in a direction crosswise of the drawing, or the sheet can be otherwise stretched in that direction.

The above description applies to the other figures, except that in Figs. 5 and 6, the holes or openings $2^b$ are not slits but are made by the removal of some of the material of the wall, as by punching or drilling, and the bars $3^b$ are elongated as by passing through rolls or stretching so that in the finished product, Figs. 7 and 8, the openings are elongated and enlarged as shown at $2^c$ and the bars are stretched as shown at $3^c$.

In Fig. 9 the separator or retainer is tubular, but such articles have heretofore been either flat, tubular or of other form, so that the present invention is concerned with the manufacture of the openings rather than with the shape of the separator or retainer and openings made by the process of this invention may be made of any suitable size, from comparatively long and very narrow up to any required dimensions.

In Fig. 9, slits $2^d$ are shown but instead of mere slits some of the material can be removed, as has been described in connection with Fig. 5. The slitted tube of Fig. 9 is enlarged radially and circumferentially as by a stretching or an expanding mandrel so that the bars $3^d$ between the slits are contracted by elongation as indicated at $3^e$ in Fig. 10, thus increasing the area of the openings $2^e$, as indicated in Fig. 10.

The initial slits or openings need not be arranged in rows, but may be staggered and both of these plans are illustrated in the drawings. For stretching or rolling, the material may be heated to render it more plastic. If the material is vulcanized rubber it may be convenient to stretch or roll it before vulcanizing.

What we claim is:

The method of making separators or retainers for storage batteries which consists in making openings in a wall or sheet, and elongating the openings and contracting the bars between the openings by permanently stretching the material of the sheet, substantially as described.

BRUCE FORD.
EDWARD WANTON SMITH.